United States Patent
Shimizu et al.

(10) Patent No.: US 9,586,500 B2
(45) Date of Patent: Mar. 7, 2017

(54) SLIDE RAIL OF VEHICLE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventors: Jueru Shimizu, Handa (JP); Tadasuke Higuchi, Kariya (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/819,759

(22) Filed: Aug. 6, 2015

(65) Prior Publication Data

US 2016/0059740 A1 Mar. 3, 2016

(30) Foreign Application Priority Data

Aug. 28, 2014 (JP) ................................ 2014-174397

(51) Int. Cl.
  *B60N 2/06* (2006.01)
  *B60N 2/68* (2006.01)
  (Continued)

(52) U.S. Cl.
  CPC ............... *B60N 2/067* (2013.01); *B60N 2/06* (2013.01); *B60N 2/0705* (2013.01); *B60N 2/682* (2013.01); *B60N 2002/024* (2013.01)

(58) Field of Classification Search
  CPC ........ B60N 2/067; B60N 2/07; B60N 2/0722; B60N 2/06
  See application file for complete search history.

(56) References Cited

U.S. PATENT DOCUMENTS 1,789,859 A * 1/1931 Bayles ............................ 384/24
4,611,778 A * 9/1986 Werner ................... F16H 25/24
                                                                        248/419

(Continued)

FOREIGN PATENT DOCUMENTS

DE         199 32 676      3/2000
DE    10 2006 008 989      5/2007
(Continued)

OTHER PUBLICATIONS

Official Action, along with English-language translation thereof, for DE Appl. No. 10 2015 215 217.0 dated Sep. 8, 2016.

*Primary Examiner* — Eret McNichols
(74) *Attorney, Agent, or Firm* — Greenblum & Bernstein, P.L.C.

(57) ABSTRACT

A slide rail of a vehicle seat includes a first rail to which a screw having a screw thread formed on an outer periphery is fixed, and a second rail that retains a nut into which the screw screws, and moves relative to the first rail by the nut rotating. The first rail has a through-hole into which the screw is inserted. At least one end of the screw has a deformed portion that is deformed toward an outside in a radial direction of the screw with respect to the first rail while the at least one end of the screw is in a state passing through the through-hole, and that keeps the screw from slipping out of the through-hole.

5 Claims, 9 Drawing Sheets (51) Int. Cl.
  *B60N 2/07* (2006.01)
  *B60N 2/02* (2006.01)

(56) References Cited

U.S. PATENT DOCUMENTS

| | | | | |
|---|---|---|---|---|
| 4,721,337 A * | 1/1988 | Tomita | B60N 2/067 | 248/393 |
| 4,802,374 A * | 2/1989 | Hamelin | B60N 2/0232 | 248/429 |
| 4,805,866 A * | 2/1989 | Aihara | B60N 2/067 | 248/429 |
| 4,962,963 A * | 10/1990 | Robinson | B60N 2/0232 | 297/362 |
| 5,048,786 A * | 9/1991 | Tanaka | B60N 2/067 | 248/429 |
| 5,125,611 A * | 6/1992 | Cox | B60N 2/0232 | 248/420 |
| 5,150,872 A * | 9/1992 | Isomura | B60N 2/0232 | 248/429 |
| 5,273,242 A * | 12/1993 | Mouri | B60N 2/067 | 248/429 |
| 5,342,013 A * | 8/1994 | Ito | B60N 2/067 | 248/424 |
| 5,707,035 A * | 1/1998 | Kargol | B60N 2/0232 | 248/429 |
| 5,762,309 A * | 6/1998 | Zhou | B60N 2/442 | 248/429 |
| 5,797,576 A * | 8/1998 | Gauger | B60N 2/067 | 248/429 |
| 5,816,555 A * | 10/1998 | Ito | B60N 2/067 | 248/424 |
| 5,823,499 A * | 10/1998 | Ito | B60N 2/067 | 248/429 |
| 5,911,789 A * | 6/1999 | Keipert | B62D 1/181 | 280/775 |
| 6,138,974 A * | 10/2000 | Okada | B60N 2/067 | 248/429 |
| 6,220,642 B1 * | 4/2001 | Ito | B60N 2/0232 | 248/429 |
| 6,260,922 B1 * | 7/2001 | Frohnhaus | B60N 2/067 | 248/424 |
| 6,290,199 B1 * | 9/2001 | Garrido | B60N 2/0232 | 248/424 |
| 6,820,851 B2 * | 11/2004 | Mochizuki | B60N 2/067 | 248/429 |
| 6,948,693 B2 * | 9/2005 | Goodbred | B60N 2/067 | 248/424 |
| 6,959,900 B2 * | 11/2005 | Hoshihara | B60N 2/067 | 248/424 |
| 6,971,620 B2 * | 12/2005 | Moradell | B60N 2/067 | 248/422 |
| 7,051,986 B1 * | 5/2006 | Taubmann | B60J 7/0573 | 248/429 |
| 7,143,513 B2 * | 12/2006 | Taubmann | B60J 7/0573 | 248/429 |
| 7,303,223 B2 * | 12/2007 | Nakamura | B60N 2/0232 | 248/429 |
| 7,325,851 B2 * | 2/2008 | Ito | B60N 2/067 | 248/429 |
| 7,407,214 B2 * | 8/2008 | Long | B60N 2/067 | 248/429 |
| 7,422,186 B2 * | 9/2008 | Kropfreiter | B60N 2/067 | 248/424 |
| 7,437,962 B2 * | 10/2008 | Taubmann | B60J 7/0573 | 248/429 |
| 7,503,537 B2 * | 3/2009 | Koga | B60N 2/0232 | 248/419 |
| 7,571,666 B2 * | 8/2009 | Borbe | B60N 2/0232 | 297/344.1 |
| 7,597,303 B2 * | 10/2009 | Kimura | B60N 2/067 | 248/424 |
| 7,641,164 B2 * | 1/2010 | Nakamura | B60N 2/0232 | 248/422 |
| 7,658,429 B2 * | 2/2010 | Koga | B60N 2/067 | 248/429 |
| 7,661,647 B2 * | 2/2010 | Ito | B60N 2/0232 | 248/429 |
| 7,669,824 B2 * | 3/2010 | Woehrle | B60N 2/067 | 248/419 |
| 7,950,616 B2 * | 5/2011 | Ehrhardt | B60N 2/067 | 248/424 |
| 8,038,197 B2 * | 10/2011 | Koga | B60N 2/067 | 296/65.18 |
| 8,061,756 B2 * | 11/2011 | Kimata | B60N 2/067 | 248/429 |
| 8,226,063 B2 * | 7/2012 | Weber | B60N 2/067 | 248/429 |
| 8,439,324 B2 * | 5/2013 | Hake | B60N 2/0232 | 248/424 |
| 8,469,432 B2 * | 6/2013 | Couasnon | B60N 2/067 | 248/503.1 |
| 8,523,263 B2 * | 9/2013 | Kimura | B60N 2/0705 | 248/429 |
| 8,820,694 B2 * | 9/2014 | Tarusawa | B60N 2/067 | 248/429 |
| 9,145,068 B2 * | 9/2015 | Bosecker | B60N 2/067 | |
| 2004/0089784 A1 * | 5/2004 | Garrido | B60N 2/0224 | 248/424 |
| 2008/0023613 A1 * | 1/2008 | Brewer | B60N 2/0232 | 248/429 |
| 2009/0243327 A1 * | 10/2009 | Koga | B60N 2/067 | 296/65.15 |
| 2010/0013284 A1 * | 1/2010 | Koga | B60N 2/067 | 297/344.1 |
| 2010/0044542 A1 * | 2/2010 | Koga | B60N 2/067 | 248/429 |
| 2010/0219813 A1 * | 9/2010 | Ito | B60N 2/0232 | 324/207.22 |
| 2010/0288903 A1 * | 11/2010 | Koga | B60N 2/0232 | 248/429 |
| 2011/0031774 A1 * | 2/2011 | Koga | B60N 2/067 | 296/65.15 |
| 2013/0186217 A1 * | 7/2013 | Enokijima | B60N 2/067 | 74/89.33 |

FOREIGN PATENT DOCUMENTS

| | | | |
|---|---|---|---|
| DE | 10 2011 004 143 | 8/2012 | |
| JP | WO 2009047948 A1 * | 4/2009 | ............ B60N 2/067 |
| JP | 5291397 | 9/2013 | |
| WO | 2012/065982 | 5/2012 | |

* cited by examiner

SLIDE RAIL OF VEHICLE SEAT

INCORPORATION BY REFERENCE

The disclosure of Japanese Patent Application No. 2014-174397 filed on Aug. 28, 2014 including the specification, drawings and abstract is incorporated herein by reference in its entirety.

BACKGROUND OF THE INVENTION

1. Field of the Invention

The invention relates to a slide rail of a vehicle seat, and more particularly, to a slide rail of a vehicle seat, which includes a first rail to which a screw having a screw thread formed on an outer periphery is fixed, and a second rail that retains a nut that screws onto the screw, and that is configured to move relative to the first rail by the nut rotating.

2. Description of Related Art

The technology described in U.S. Pat. No. 7,669,824, for example, is one known example of such a slide rail of a vehicle seat. In this related art, when a driving source is driven, an upper rail electrically slides on a lower rail by the nut moving relative to the screw. As a result, the vehicle seat is able to be electrically slid easily.

SUMMARY OF THE INVENTION

However, in the technology described in U.S. Pat. No. 7,669,824 described above, both ends (i.e., one end and the other end) of the screw are fastened by welding to a bracket that is fixed to the lower rail. Therefore, the degree of straightness of the screw may end up decreasing due to welding heat at the time of welding. Also, from the viewpoint of ensuring the necessary strength of the weld, the range of the weld (i.e., the weld length) ends up being long, and as a result, the bracket ends up being large.

The invention thus provides a slide rail of a vehicle seat that includes a first rail to which a screw having a screw thread formed on an outer periphery is fixed, and a second rail that retains a nut that screws onto the screw, and that is configured to move relative to the first rail by the nut rotating. This slide rail of a vehicle seat enables the screw to be fixed to the first rail without leading to a decrease in the degree of straightness of the screw or an increase in the size of the fixing portion of the screw.

An aspect of the invention relates to a slide rail of a vehicle seat, which includes a first rail to which a screw having a screw thread formed on an outer periphery is fixed, and a second rail that retains a nut into which the screw screws, and moves relative to the first rail by the nut rotating. The first rail has a through-hole into which the screw is inserted. At least one end of the screw has a deformed portion that is deformed toward an outside in a radial direction of the screw with respect to the first rail while the at least one end of the screw is in a state passing through the through-hole, and that keeps the screw from slipping out of the through-hole.

According to this aspect, the screw is able to be fixed to the first rail, similar to the related art. Also, unlike the related art, the screw is able to be fixed to the first rail without the need for welding, so the degree of straightness of this fixed screw will not decrease. Also, because there is no need for welding, the fixing portion of the screw will not end up becoming large.

Also, in the slide rail of the aspect described above, the first rail may have a bracket, the through-hole may be provided in the bracket, and insertion of the at least one end of the screw into the through-hole may be performed by screwing.

According to this structure, the degree of fixing of the rear end of the screw to the bracket is able to be higher than it is when the rear end of the screw is simply inserted, without being screwed in.

Also, with the slide rail of the aspect described above, a restricting portion that restricts an amount that the screw is inserted into the through-hole may be provided on at least one of the screw and the through-hole.

According to this structure, the protrusion amount of the screw that is necessary for crimping is constant, so the appearance of the finished crimped portion is able to be improved.

Also, in the slide rail having this structure, the restricting portion may be formed by a step provided on at least one of the screw and inside of the through-hole.

According to this structure, similar operation and effects as those of the earlier structure are able to be obtained in this case as well. Also, restricting is also able to be easily achieved by the step.

Also, in the slide rail having the structure described earlier, an incomplete thread may be formed on the screw or the through-hole.

According to this structure, similar operation and effects as those of the earlier structure are able to be obtained in this case as well. Also, restricting is also able to be easily achieved by the incomplete thread.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, modes for carrying out the invention will be described with reference to FIGS. 1 to 9. Also, in the description below, up, down, front, rear, left, and right indicate directions of up, down, front, rear, left, and right in the drawings, i.e., directions of up, down, front, rear, left, and right based on a state in which a vehicle seat 1 is arranged inside a vehicle, not shown, such as an automobile.

Figure 1:
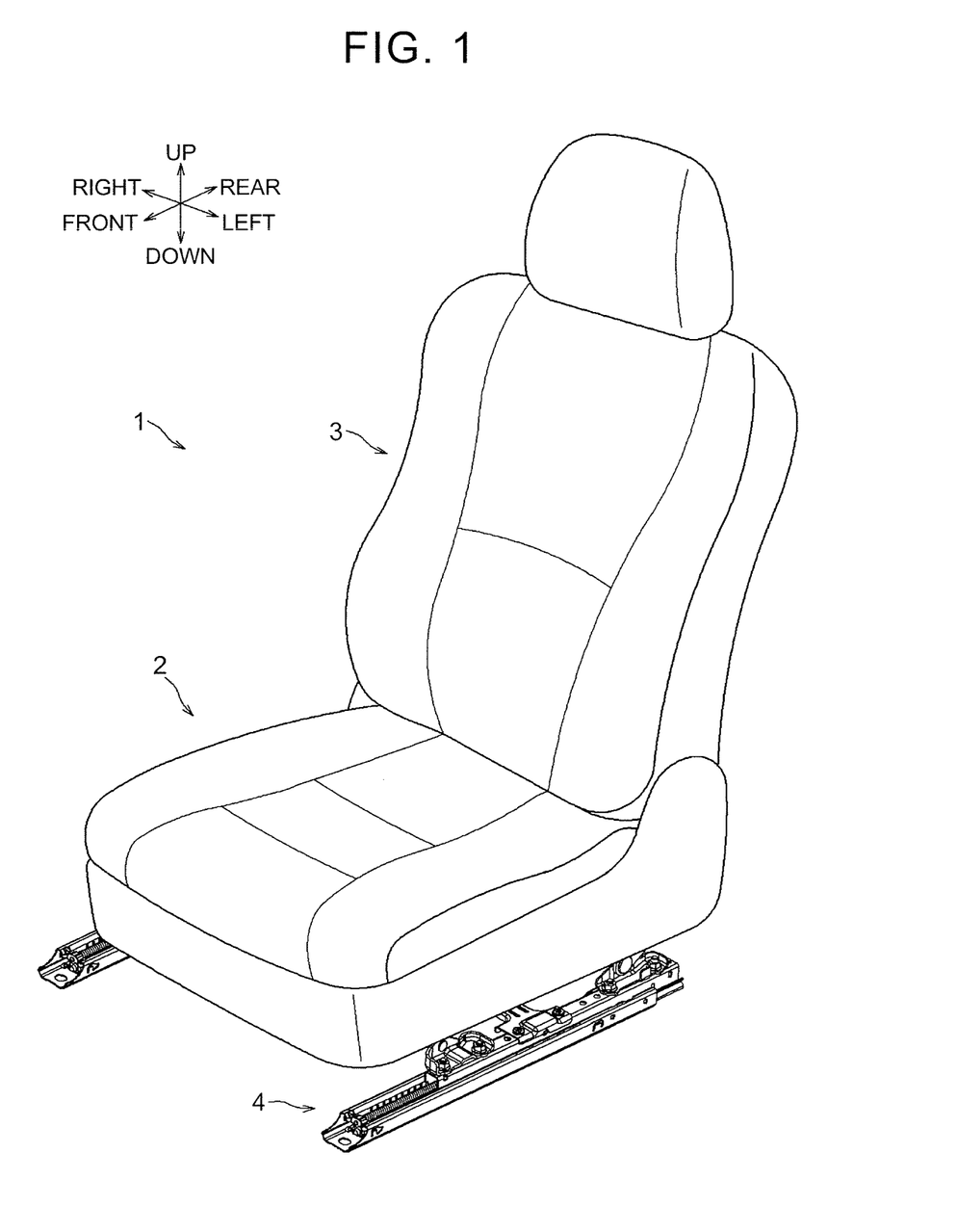
FIG. 1 is an overall perspective view of a vehicle seat according to an example embodiment of the invention.

First, the structure of the vehicle seat 1 will be described with reference to FIG. 1. This vehicle seat 1 is formed by a seat cushion 2, a seatback 3, and a power slide device 4. Of the seat cushion 2, the seatback 3, and the power slide device 4, the seat cushion 2 and the seatback 3 are well-known, so only the power slide device 4 will be described below.

Figure 2:
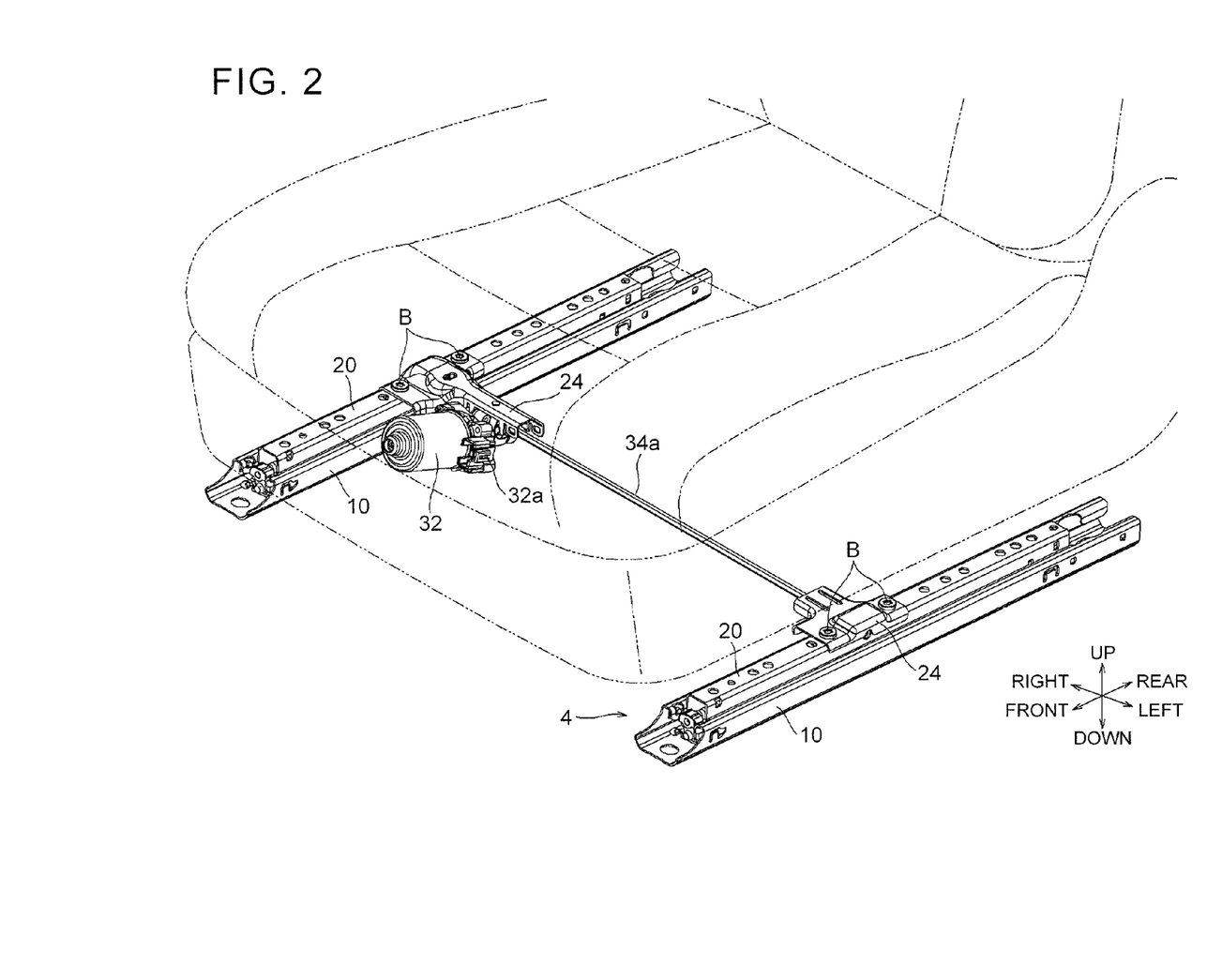
FIG. 2 is an enlarged view of a power slide device shown in FIG. 1.
Figure 3:
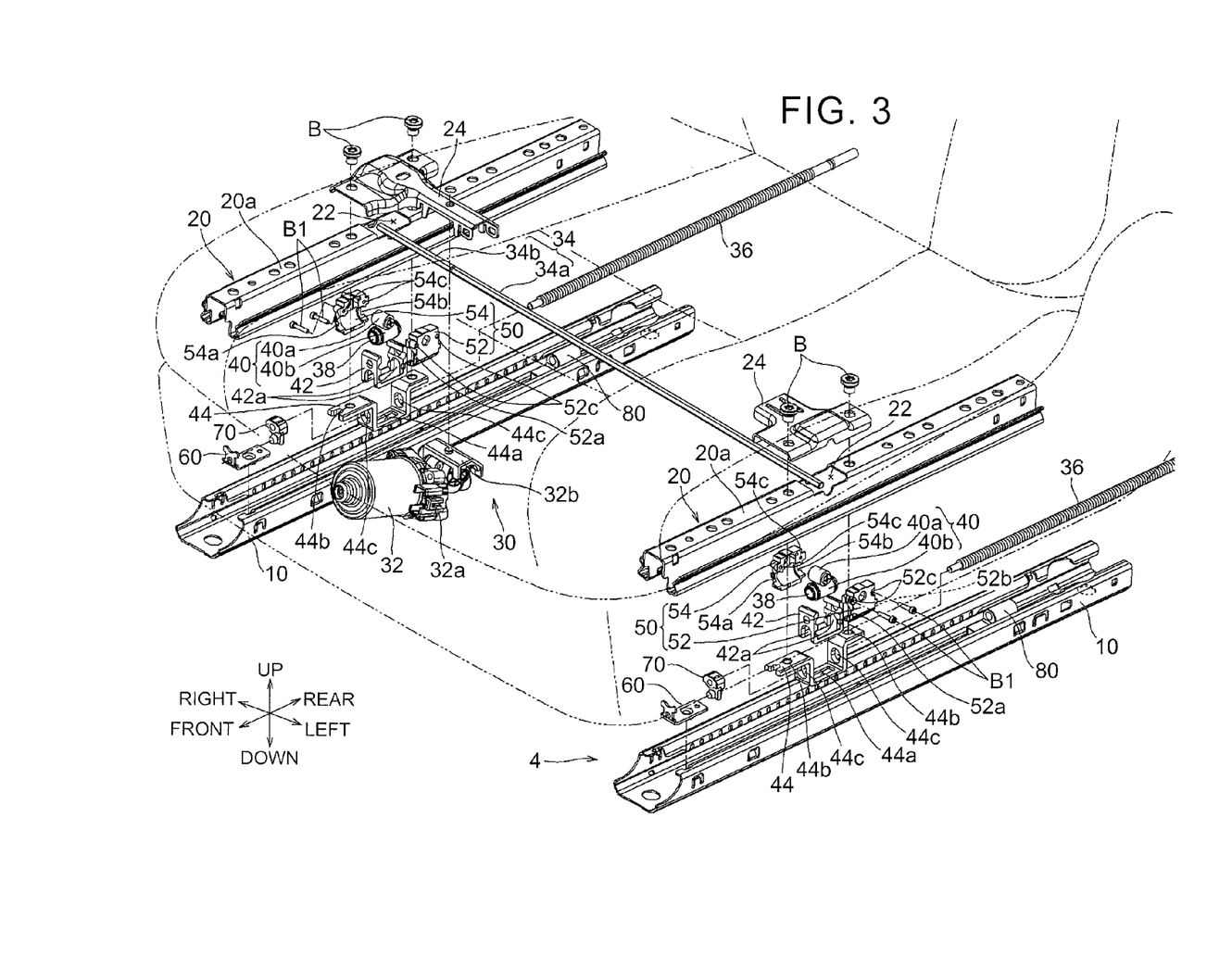
FIG. 3 is an exploded view of FIG. 2.

As shown in FIGS. 2 and 3, the power slide device 4 includes left and right lower rails 10 assembled to a floor of the vehicle (neither of which is shown), left and right upper rails 20 slidably assembled to the left and right lower rails 10, and an electric drive mechanism 30 that electrically slides the left and right upper rails 20 on the left and right lower rails 10. Hereinafter, the left and right lower rails 10, the left and right upper rails 20, and the electric drive mechanism 30 will be described individually. In the description below, portions provided in plurality, such as the lower rails 10 and the upper rails 20, may be described in the singular to simplify the description and facilitate understanding.

Figure 9:
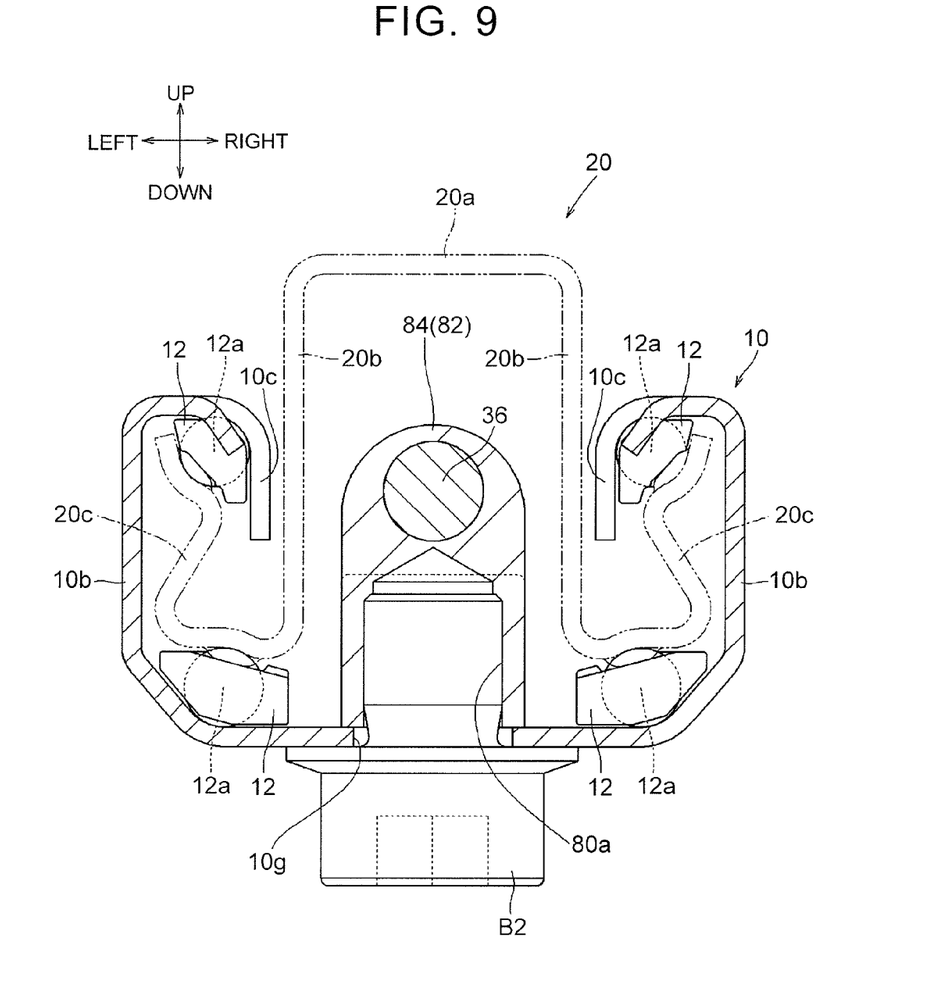
FIG. 9 is a sectional view taken along line IX-IX in FIG. 8.

First, the lower rail 10 will be described (see FIG. 9). This lower rail 10 is formed in a long shape that extends in a front-rear direction of the vehicle, not shown. This lower rail 10 includes a bottom surface 10a, left and right side surfaces 10b that rise up from the left and right of the bottom surface 10a, and left and right falling surfaces 10c that fall in a direction toward each other from upper edges of the left and right side surfaces 10b. A long resin shoe 12 that has a plurality of (e.g., four) rigid spheres 12a is assembled, so as to be able to slide in the length direction, on the inside surface of this lower rail 10. This resin shoe 12 is fixed at substantially four corners of the inside surface of the lower rail 10. As a result, when the upper rail 20 slides on the lower rail 10, the sliding action is able to be smooth.

Figure 4:
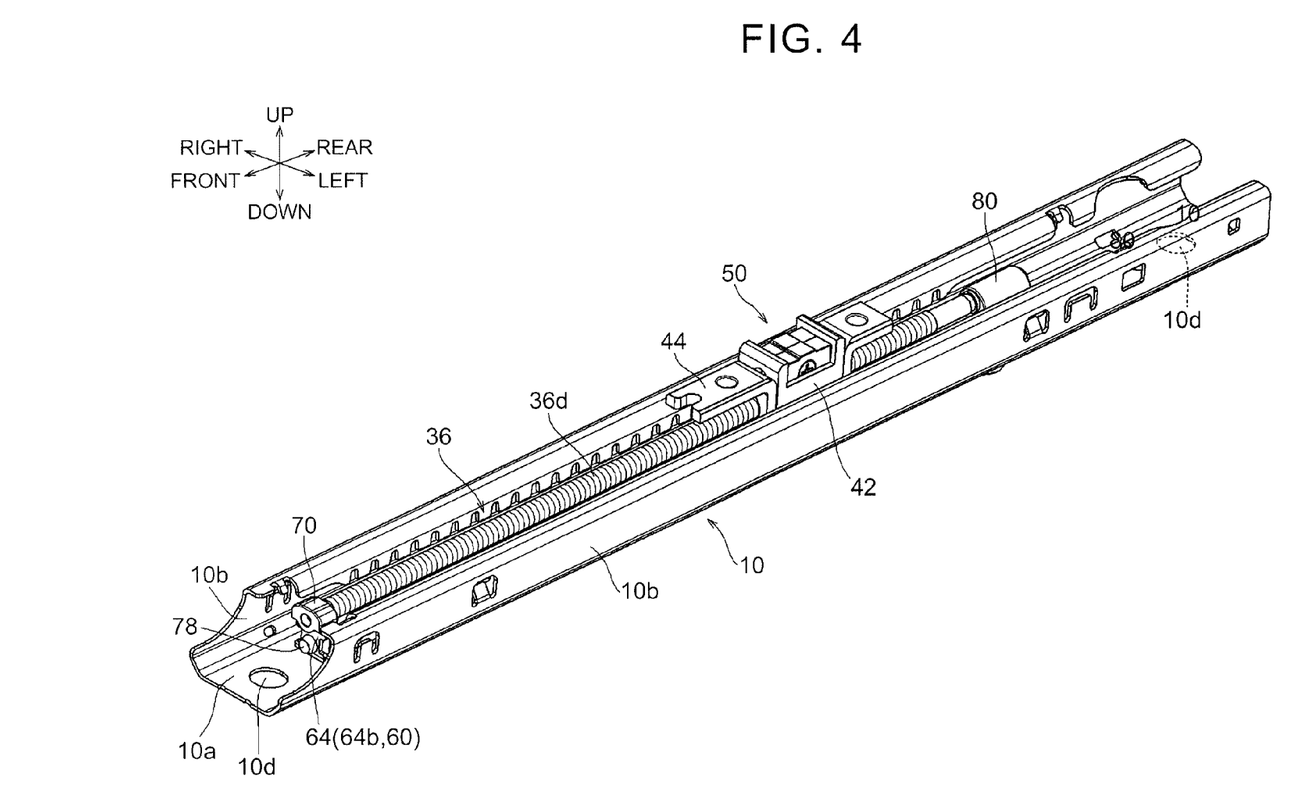
FIG. 4 is an enlarged view of a left lower rail in FIG. 3.
Figure 5:
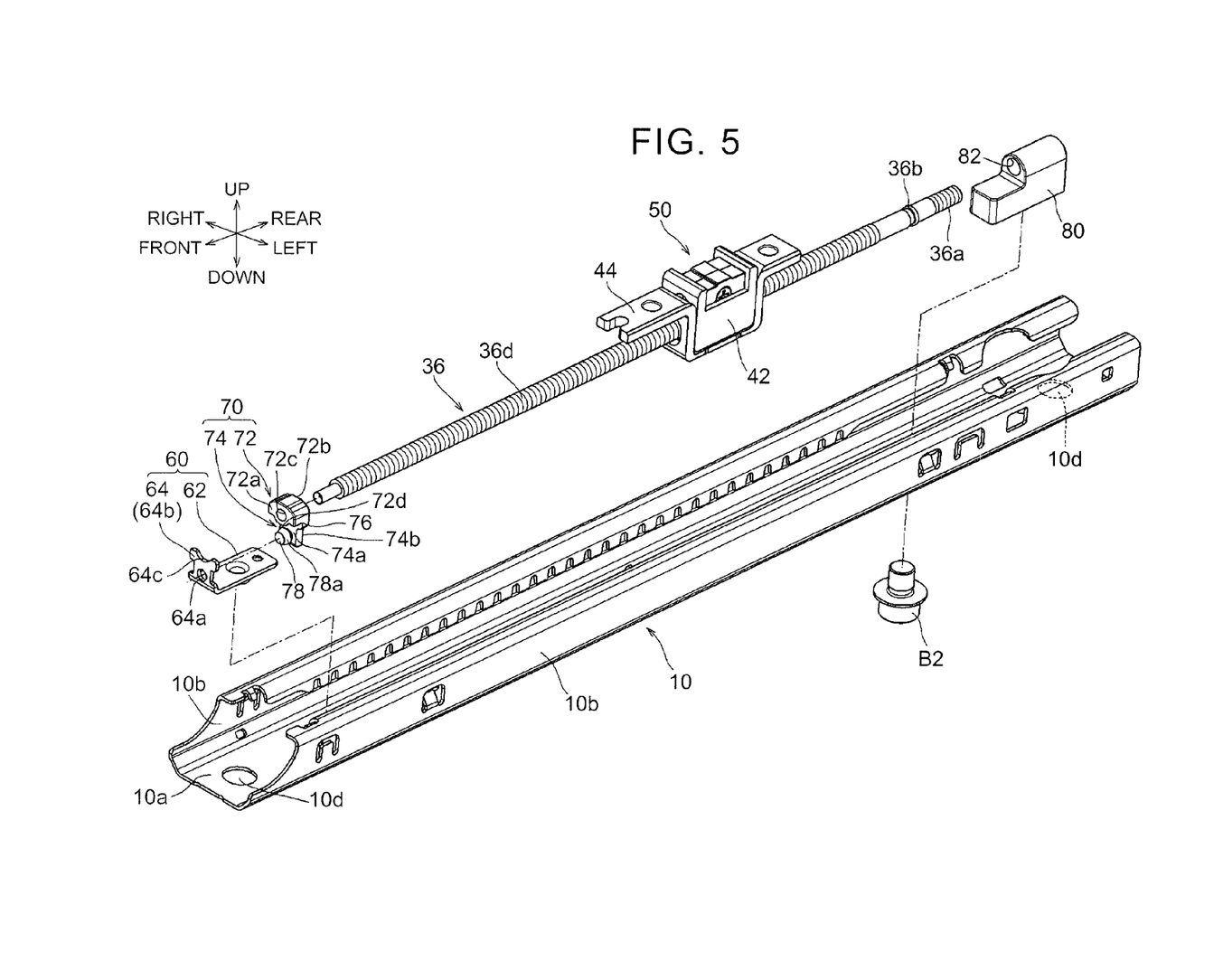
FIG. 5 is an exploded view of FIG. 4.
Figure 6:
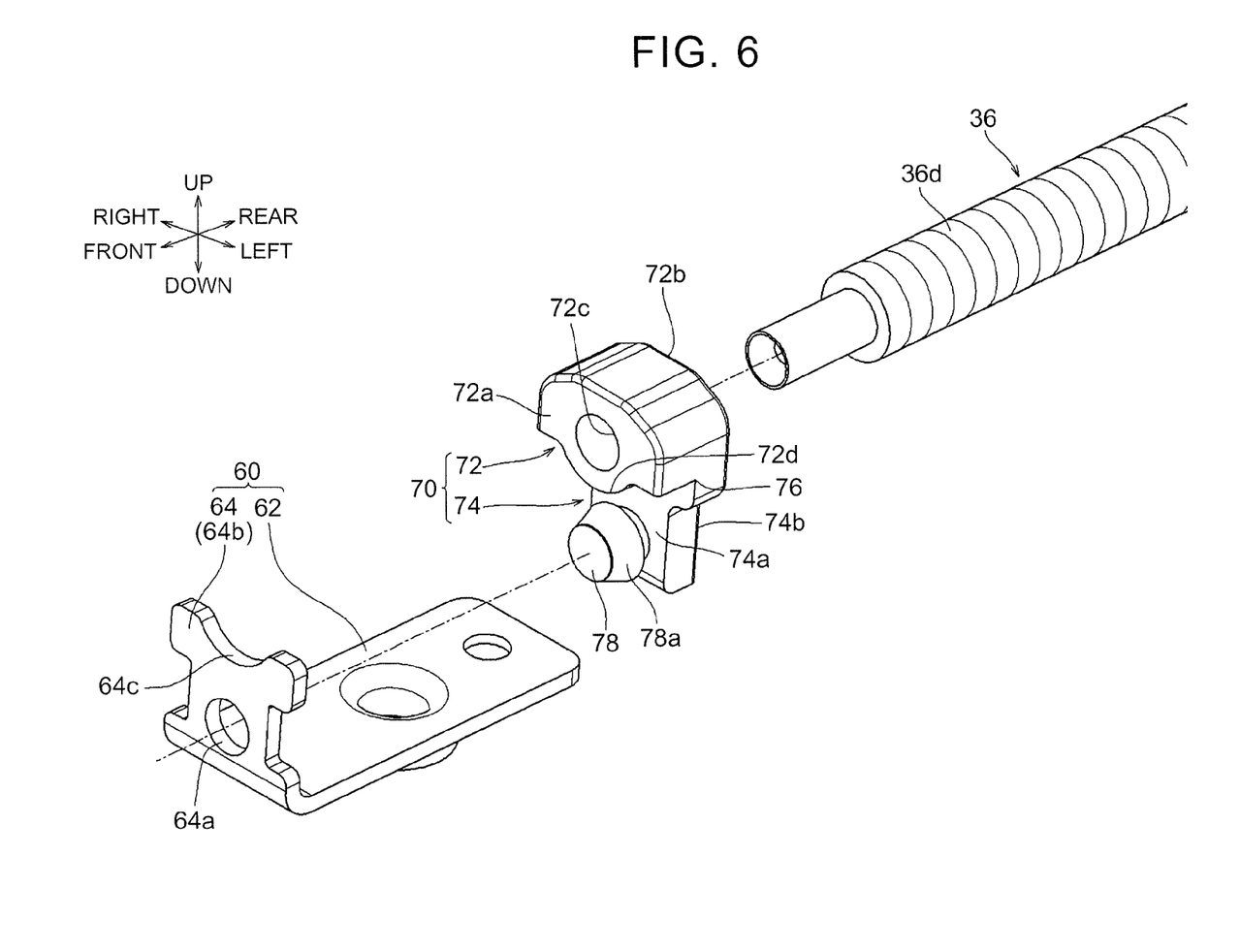
FIG. 6 is an enlarged view of the main portions in FIG. 5.
Figure 7:
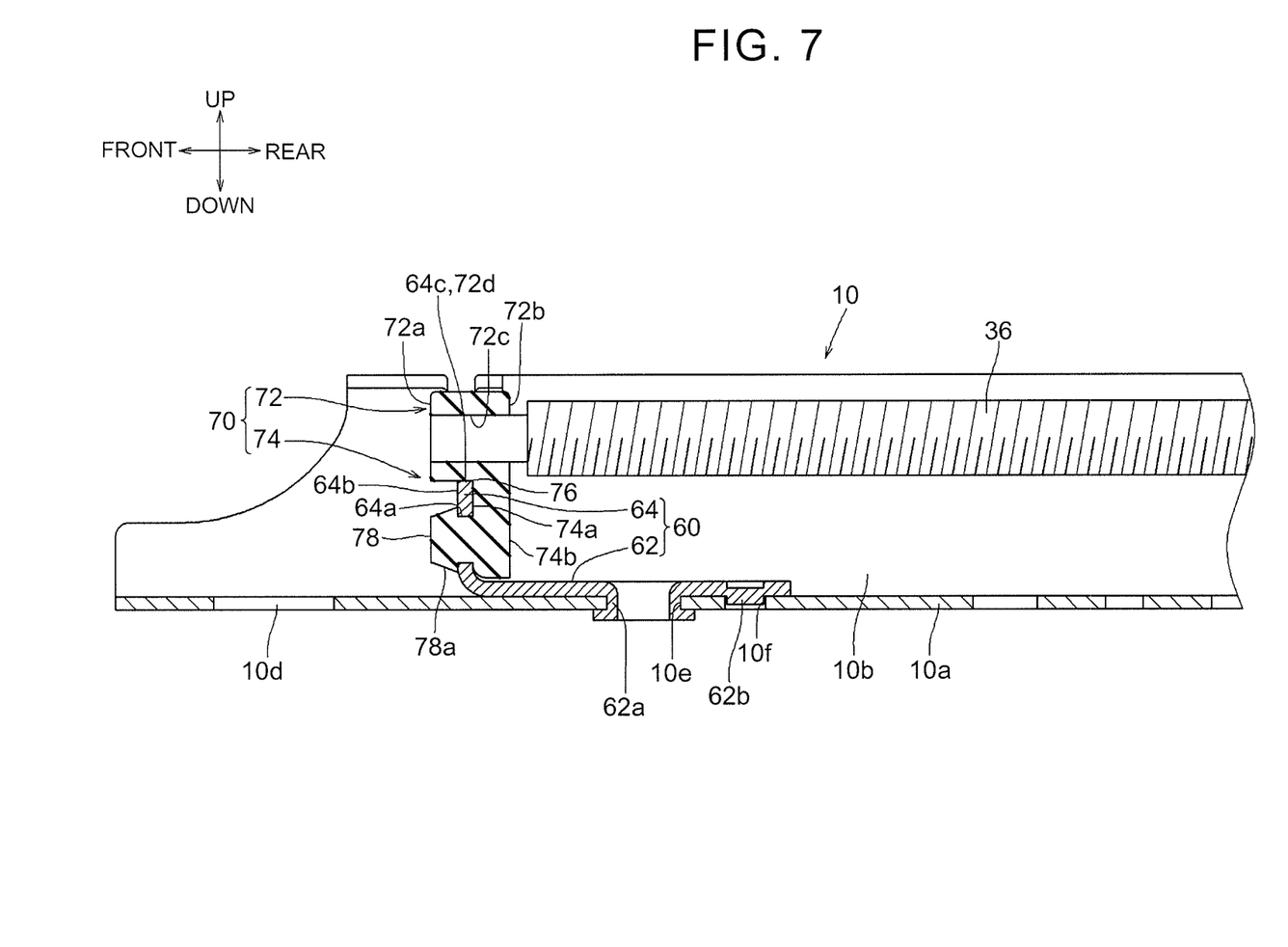
FIG. 7 is a longitudinal sectional view of the front end side in FIG. 4.

Also, insertion holes 10d into which bolts, not shown, are able to be inserted, are formed in both ends (front and rear ends) of the lower rail 10 (see FIG. 4). These insertion holes 10d are formed corresponding to mounting holes, not shown, formed in the vehicle floor, also not shown. A nut, not shown, is fixed to an edge of the mounting hole, on the side opposite the vehicle floor side. Thus, the lower rail 10 is able to be fastened to the floor by inserting the bolts, not shown, into the insertion holes 10d in the lower rail 10 and screwing these inserted bolts into the nuts. This lower rail 10 is formed in a pair, with one on the left and one on the right. The lower rail 10 is formed as described above.

Next, the upper rail 20 will be described (see FIG. 9). This upper rail 20 is also formed in a long shape that extends in the front-rear direction of the vehicle, not shown, similar to the lower rail 10 described above. This upper rail 20 also includes an upper surface 20a, left and right side surfaces 20b that fall from the left and right of this upper surface 20a, and left and right rising surfaces 20c that rise in a direction away from each other from lower edges of these left and right side surfaces 20b. The upper rail 20 is assembled to the lower rail 10 so as to be able to slide in the length direction. Also, an opening 22 is formed in the upper surface 20a of this upper rail 20. This opening 22 is for fastening another end of a shaft 34 to a worm gear 40a of a gear subassembly 40 that is housed in a recess 44a of a holder 44, described later, that is assembled inside of this upper rail 20, as will be described later.

This opening 22 is covered by a generally T-shaped cover 24. At this time, screws B that fasten this cover 24 pass through the upper rail 20 and are fastened to the holder 44, described later, that is assembled inside the upper rail 20. This fastening is accomplished by screwing the screw B onto an internal thread, not shown, in a screw hole 44b formed in the holder 44. When the screw B is able to be screwed onto an internal thread in the screw hole 44b in this way, there is no need for a mating member, such as a nut, for fastening this screw B. Therefore, a tip end of the screw B is able to be prevented from protruding out from the holder 44. Consequently, the tip end of the screw B is able to be prevented from contacting a screw 36 that will be described later. In this way, the cover 24 is assembled to an upper surface of the upper rail 20 by the screws B, and the holder 44 is assembled inside the upper rail 20. This upper rail 20 is also formed in a pair, with one on the left and one on the right, similar to the lower rail 10. The upper rail 20 is formed as described above.

Lastly, the electric drive mechanism 30 will be described. The electric drive mechanism 30 includes a motor 32, a shaft 34 that includes a left shaft 34a and a right shaft 34b, left and right screws 36 having a screw thread 36d formed on an outer periphery, left and right nuts 38, and left and right gear subassemblies 40 each having a worm gear 40a and a wheel gear 40b. A reduction gear unit 32a having a mounting bracket 32b is provided with the motor 32. This mounting bracket 32b is fastened to a tip end of the right cover 24, described later, by crimping.

The left shaft 34a is connected at one end to the reduction gear unit 32a, and is fastened at the other end to the worm gear 40a of the left gear subassembly 40. Meanwhile, the right shaft 34b is connected at one end to the reduction gear unit 32a, and is fastened at the other end to the worm gear 40a of the right gear subassembly 40, similar to the left shaft 34a.

Now the left screw 36 will be described. A thread 36a is formed on a rear end of the left screw 36 (see FIGS. 5 and 8). This rear end is formed having a circular longitudinal cross-section. Also, a flange 36b that is able to contact an edge of a through-hole 82 in a rear bracket 80 that will be described later, is formed on an outer peripheral surface of a rear side of the left screw 36. Therefore, when the rear end of the left screw 36 is push through the through-hole 82 in the rear bracket 80, described later, the flange 36b of the left screw 36 will contact the edge of the through-hole 82 in the rear bracket 80. The thread 36a is formed to the rear of the flange 36b, as is evident from FIG. 8.

Figure 8:
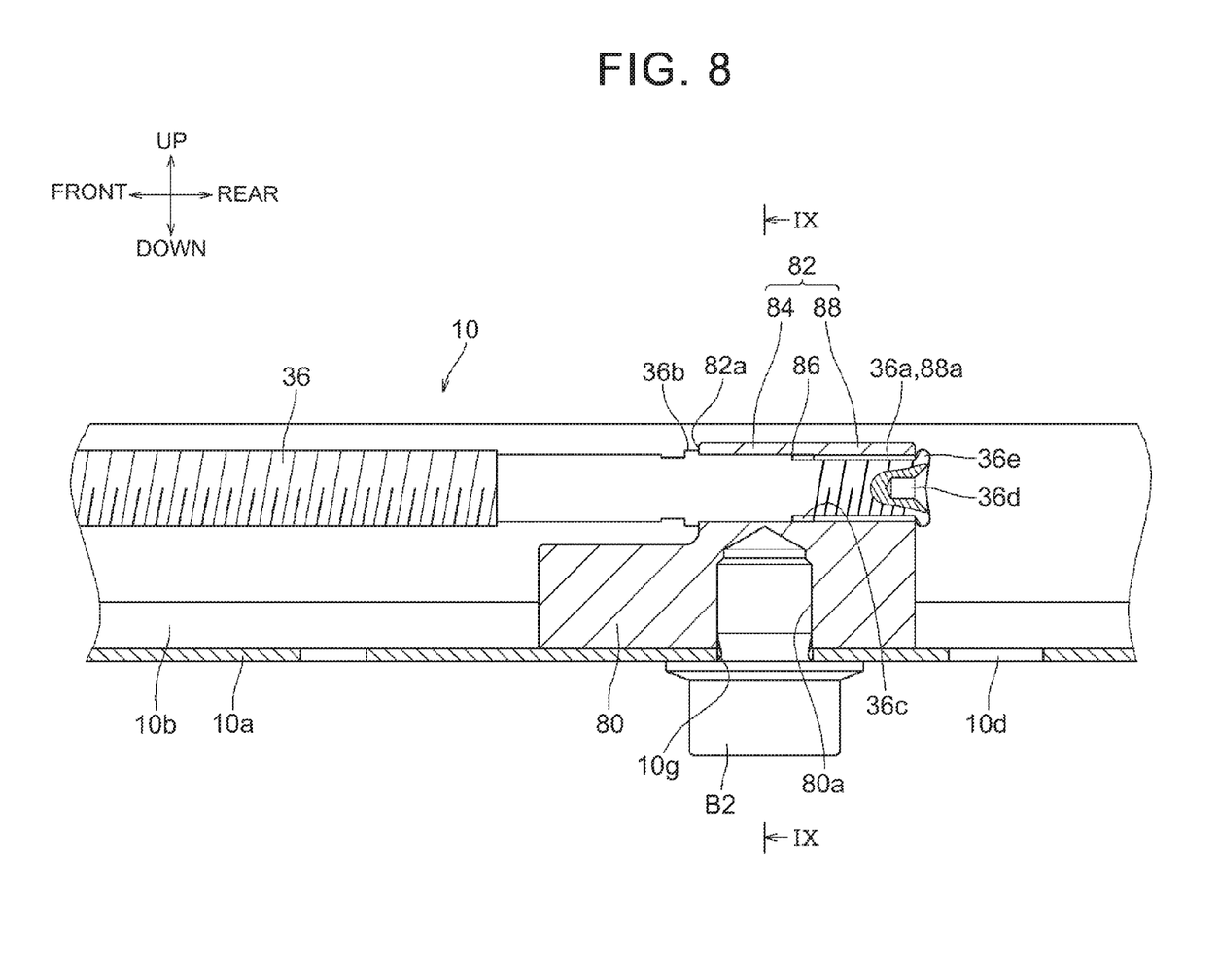
FIG. 8 is a longitudinal sectional view of the rear end side in FIG. 4.

Therefore, the rear end of the inserted screw 36 is able to protrude a predetermined amount necessary for crimping, which will be described later. Naturally, the position of the flange 36b of the left screw 36 is set to realize this. A base end side of the thread 36a of the left screw 36 is an incomplete thread 36c. Also, a recessed hole 365d for crimping that will be described later is formed in a rear end surface of this left screw 36. The left screw 36 formed in this way is fixed inside the left lower rail 10.

Here, the specific manner in which the left screw 36 is fixed inside the left lower rail 10 will be described in detail with reference to FIGS. 4 to 8. A front end of the left screw 36 is fixed inside the left lower rail 10 via a front bracket 60 and a rubber damper 70. The front bracket 60 is integrally formed so as to form a general L-shape by a bottom piece 62 and a rising piece 64 that has a through-hole 64a. When integrally formed in this way, the front bracket 60 achieves two functions with a single member. More specifically, as the first function, a flange 62a is formed on the bottom piece 62, so the front bracket 60 is able to be fastened by crimping to the bottom surface 10a of the left lower rail 10 via this flange 62a, as will be described later. Also, as the second function, the through-hole 64a is formed in the rising piece 64, so an engaging body 74 of the rubber damper 70 is able to engage with this through-hole 64a, as will be described later. A recessed portion 64c that is recessed in an arc-shape is formed on an upper edge of this rising piece 64.

Also, the rubber damper 70 includes a retaining body 72 that has a through-hole 72c passing between a front surface 72a and a rear surface 72b of the rubber damper 70, which is able to accept and retain the screw 36, and an engaging body 74 that has a generally conical protrusion 78 that is lined up with a bottom side of the retaining body 72 and is able to engage with the front bracket 60. The through-hole 72c in the retaining body 72 is formed to be able to accept a front end of the left screw 36 (i.e., such that the front end of the left screw 36 is able to be inserted into the through-hole 72c). Also, a front surface 74a of this engaging body 74 is recessed via a step 76 from the front surface 72a of the retaining body 72 (see FIGS. 6 and 7). Therefore, the engaging body 74 is thinner than the retaining body 72 in the front-rear direction. Therefore, the retaining body 72 is able to easily bend with respect to the engaging body 74.

An arcuate portion 72d that protrudes in an arc-shape so as to correspond to the recessed portion 64c of the front bracket 60 when the rubber damper 70 (i.e., the engaging body 74) is assembled to the front bracket 60, is formed on a lower edge of the front side of the retaining body 72. As a result, when the rubber damper 70 is assembled to the front bracket 60, the arcuate portion 72d of the assembled rubber damper 70 is supported by the recessed portion 64c of the front bracket 60. Also, a recessed depth of the front surface 74a (a recessed surface) of this engaging body 74 is set greater than the thickness of the rising piece 64 of the front bracket 60 (see FIG. 7).

Further, a protrusion 78 of the engaging body 74 is formed so as to be able to be inserted into the through-hole 64a of the rising piece 64. A hook 78a of which a base end protrudes toward a tip end thereof to form a point is formed in a circumferential direction on an outer peripheral surface of this protrusion 78. Also, when the protrusion 78 is inserted into the through-hole 64a of the rising piece 64, the hook 78a of the inserted protrusion 78 is pushed against the edge of the through-hole 64a and is deflected. The deflected hook 78a soon passes beyond the edge of the through-hole 64a of the rising piece 64, and when this happens, the deflection in the hook 78a will be restored and the hook 78a will catch on the edge of the through-hole 64a of the rising piece 64. As a result, the engaging body 74 of the rubber damper 70 is able to engage with the rising piece 64 of the front bracket 60. The rubber damper 70 that is engaged in this way is arranged inside of the left upper rail 20. Therefore, this rubber damper 70 will not contact the left upper rail 20. The protrusion 78 of the engaging body 74 is able to be inhibited from easily coming out of the through-hole 64a in the rising piece 64 by having this protrusion 78 be the hook 78a.

The bottom piece 62 of the front bracket 60 to which the protrusion 78 of the engaging body 74 is engaged in this way is fastened by crimping to a front side inside of the left lower rail 10. Here, this crimping will be described in detail. The flange 62a that has undergone a burring process is formed on the bottom piece 62 of the front bracket 60. Also, this flange 62a is inserted into a mounting hole 10e formed in the bottom surface 10a of the lower rail 10. When this insertion is complete, the tip end of the inserted flange 62a is crimped such that it expands outward in the radial direction. In this way, the bottom piece 62 of the front bracket 60 is crimped to the bottom surface 10a of the lower rail 10.

At this time, a protrusion 62b formed on the bottom piece 62 of the front bracket 60 is inserted into a mounting hole 10f formed in the bottom surface 10a of the lower rail 10. Therefore, the front bracket 60 is able to be prevented from rotating with respect to the bottom surface 10a of the lower rail 10, even when crimping is performed as described above. When the protrusion 78 of the rubber damper 70 is engaged with the through-hole 64a of the rising piece 64 of the front bracket 60 as described above, a surface 64b of the rising piece 64 is positioned so as to form a recess from (i.e., is set back from) the front surface 72a of the retaining body 72 of the rubber damper 70. Therefore, the retaining body 72 is in a state protruding forward in a manner covering the rising piece 64. Also, when the protrusion 78 of the rubber damper 70 is engaged with the through-hole 64a of the rising piece 64 of the front bracket 60 as described above, this engaged rubber damper 70 is arranged inside the left lower rail 10, and even if the left upper rail 20 slides, the engaged rubber damper 70 is positioned inside of this left upper rail 20 that has been slid.

Meanwhile, a rear end of this left screw 36 is also fixed inside the left lower rail 10 via a rear bracket 80. This rear bracket 80 will now be described. The rear bracket 80 is formed in a general L-shape in a side view (see FIG. 8). Also, an upper surface of this rear bracket 80 is formed in an arch (see FIG. 9). Further, a through-hole 82 is formed on the upper side of the rear bracket 80, and passes through the rear bracket 80 in the front-rear direction. The rear bracket 80 is made of iron. The through-hole 82 is also formed having a circular longitudinal cross-section so as to correspond to the rear end of the screw 36. Also, a front side of this through-hole 82 is a large diameter portion 84, and a rear side of the through-hole 82 becomes a small diameter portion 88 via a step 86. A thread 88a that is able to screw onto the thread 36a of the left screw 36 is formed on the inside surface of this small diameter portion 88.

Then, the rear end of the left screw 36 is pushed through the through-hole 82 in the rear bracket 80 until the flange 36b of the left screw 36 contacts the edge of the through-hole 82 of the rear bracket 80. That is, the thread 36a of the left screw 36 is screwed onto the thread 88a of the through-hole 82 of the rear bracket 80 until the flange 36b of the left screw 36 contacts the edge of the through-hole 82 of the rear bracket 80.

Next, the rear end of the left screw 36 that protrudes a predetermined amount from the through-hole 82 of the rear bracket 80 (i.e., the tip end of the thread 36a) is crimped (e.g., spin caulked) toward the outside in the radial direction of the left screw 36 with respect to the rear bracket 80 (see FIG. 8). This crimping is an example of "deforming" described in the scope of the claims. Reference character 36e in FIG. 8 is the crimped portion (i.e., crimped portion 36e). As a result, the rear end of the left screw 36 is fastened to the rear bracket 80. When the rear end of the left screw 36 is crimped in this way, the rear end of the screw 36 is formed having a circular transverse cross-section, so this crimped portion 36e is formed in the circumferential direction. Therefore, the rear end of the screw 36 after crimping is able to be inhibited from easily coming out of the through-hole 82 of the rear bracket 80. Also, this crimped portion 36e is formed spreading out evenly in the circumferential direction, so a load from the screw 36 is able to be stably received. The left nut 38 is screwed onto the left screw 36 that is fastened at the rear end to the rear bracket 80 in this way.

Also, next, the flange 62a formed on the bottom piece 62 of the front bracket 60 into which the protrusion 78 of the rubber damper 70 is pushed is fastened by crimping to the front side inside of the left lower rail 10. Also, the front end of the left screw 36 is then pushed into a through-hole 70a in the rubber damper 70 that is assembled to this fastened front bracket 60. Finally, the rear bracket 80 is fastened by a bolt B2 to a rear side inside of the left lower rail 10. This fastening is accomplished by screwing the bolt B2 onto an internal thread, not shown, in a bolt hole 80a formed in a bottom surface of the rear bracket 80 via an insertion hole 10g formed in the bottom surface 10a of the left lower rail 10 (see FIGS. 8 and 9). In this way, the left screw 36 is fixed to the left lower rail 10. The right screw 36 is fixed inside the right lower rail 10, similar to the left screw 36.

Also, as described above, when screwing the left screw 36 into the left nut 38, the left screw 36 that is to be screwed in is inserted through through-holes 42a and 44c (52a, 52b, 54a, and 54b) formed in a damper rubber 42, the holder 44, and a left housing 50 that will be described later. Also, when the screwing in is complete, an internal thread formed on an inside surface of this left nut 38 is in mesh with an external thread formed on an outside surface of the left screw 36. Therefore, when this left nut 38 is rotated, the left screw 36 is able to move forward and backward relative to the left nut 38. The wheel gear 40b of the left gear subassembly 40 is formed on an outside surface of this left nut 38. That is, the left nut 38 and the wheel gear 40b are integrally formed. Therefore, when the wheel gear 40b is rotated, the left screw 36 is able to move forward and backward relative to this left nut 38. Meanwhile, the right nut 38 is also assembled in a state screwed onto the right screw 36, similar to the left nut 38. The wheel gear 40b of the right gear subassembly 40 is formed on an outside surface of this right nut 38.

The worm gear 40a of the left gear subassembly 40 is fastened to the other end of the left shaft 34a, as described above. The worm gear 40a and the wheel gear 40b of this left gear subassembly 40 are connected together such that their rotational axes are orthogonal to one another. Meanwhile, the worm gear 40a of the right gear subassembly 40 is fastened to the other end of the right shaft 34b, as described above, similar to the worm gear 40a of the left gear subassembly 40. The worm gear 40a and the wheel gear 40b of this right gear subassembly 40 are connected together such that their rotational axes are orthogonal to one another.

The left and right gear subassemblies 40 structured in this way are retained in left and right housings 50. These left and right housings 50 will now be described. The left and right housings 50 and the assembly structures thereof are left-right symmetrical, so only the left housing 50 will be described. A description of the right housing 50 will be omitted.

The left housing 50 includes a left case 52 and a right case 54. These left and right cases 52 and 54 have a split construction, and are able to be assembled with screws B1. Through-holes 52c that these screws B1 are able to be inserted into, and screw holes 54c that have internal threads that these screws B1 screw into, are formed in the left and right cases 52 and 54. Therefore, when these cases 52 and 54 are assembled via the screws B1, the left housing 50 that is able to retain the left gear subassembly 40 described above is finished. Semicircular notches 52a, 52b, 54a, and 54b are formed in advance in the left and right cases 52 and 54 such that a through-hole into which the left screw 36 is able to be inserted is formed in the finished left housing 50. Each of these left and right cases 52 and 54 is integrally formed from a rigid synthetic resin by injection molding.

The left housing 50 made from these left and right cases 52 and 54 is housed in the recess 44a of the U-shaped left holder 44 via the left damper rubber 42 in a state sandwiching the worm gear 40a and the wheel gear 40b of the left gear subassembly 40.

Then, the left holder 44 that houses this left housing 50 is assembled inside the left upper rail 20 as described above. When assembled in this way, the worm gear 40a of the left gear subassembly 40 protrudes from the opening 22, so the other end of the left shaft 34a is able to be fastened to this protruding worm gear 40a. The electric drive mechanism 30 is formed in this way. The left and right lower rails 10, the left and right upper rails 20, and the electric drive mechanism 30 together form the power slide device 4.

Continuing on, the operation of the vehicle seat 1 provided with this power slide device 4 will be described. When driving the motor 32, the left and right nuts 38 rotate via the left and right shafts 34 (i.e., the left shaft 34a and the right shaft 34b), and the left and right gear subassemblies 40 (i.e., the left worm gear 40a, the left wheel gear 40b, the right worm gear 40a, and the right wheel gear 40b). As a result, the rotated left and right nuts 38 move with respect to the left and right screws 36, so the left and right upper rails 20 are able to slide electrically on the left and right lower rails 10.

The vehicle seat 1 according to the example embodiment of the invention is formed as described above. According to this structure, the rear bracket 80 having the through-hole 82 is fastened to the lower rail 10. The rear end of the screw 36 is inserted into the through-hole 82. The rear end of the screw 36 has the crimped portion 36e that is crimped toward the outside in the radial direction thereof with respect to the rear bracket 80. Therefore, the rear end of the screw 36 is able to be fastened to the rear bracket 80 that is fastened to the lower rail 10, similar to the related art. Also, unlike the related art, the rear end of the screw 36 is able to be fastened to the rear bracket 80 without the need for welding, so the degree of straightness of this fastened screw 36 will not decrease. Also, because there is no need for welding, the size of the rear bracket 80 will not be large. Also, because there is no need for welding, there is no need for a cover or the like that covers this welded portion. Further, because there is no need for welding, welding spatter will not get on the screw 36.

Also, with this structure, the rear end of the left screw 36 is screwed into the through-hole 82 of the rear bracket 80. Therefore, the degree of fastening of the rear end of the screw 36 to the rear bracket 80 is able to be higher than it is when the rear end of the screw 36 is simply inserted, without being screwed, into the through-hole 82 of the rear bracket 80.

Further according to this structure, the flange 36b that is able to contact the edge of the through-hole 82 in the rear bracket 80 is formed ion the outer peripheral surface of the rear side of the screw 36. Therefore, when the rear end of the screw 36 is pushed through the through-hole 82 in the rear bracket 80, the flange 36b of this screw 36 contacts the edge of the through-hole 82 in the rear bracket 80. As a result, the rear end of the inserted screw 36 is able to protrude the predetermined amount necessary for crimping. Naturally, the position of the flange 36b of the screw 36 is set to realize this. Therefore, the protrusion amount of the screw 36 that is necessary for crimping is constant, so the appearance of the finished crimped portion 36e is able to be improved.

The content described above relates to only one example embodiment of the invention. The invention is in no way limited to this content.

The vehicle seat may be a seat for any of a variety of types of vehicles, such as a seat for a marine vessel, a seat for an aircraft, or a seat for a railcar, or the like.

Also, in the example embodiment, a mode in which the rear end of the screw 36 is crimped is described. However, the invention is not limited to this. Alternatively, the front end of the screw 36 may be crimped. Of course, the rear end and the front end of the screw 36 may be crimped. Similar operation and effects as those of the example embodiment are able to be obtained in this case as well.

Also, in the example embodiment, as an example of the restricting portion, a mode (example embodiment) is described in which the flange 36b of the screw 36 contacts the edge 82a of the through-hole 82 in the rear bracket 80, but the restricting portion is not limited to this. Alternatively, a mode (a first modified example) in which the flange 36b of the screw 36 contacts the step 86 of the through-hole 82 in the rear bracket 80 may be also possible. Similar operation and effects as those of the example embodiment are able to be obtained in this case as well. Also, restricting is also able to be easily achieved by the step 86.

Also, another example of the restricting portion may be a mode (a second modified example) in which the incomplete thread 36c of the screw 36 bites into the base end side (i.e., the front side) of the thread 88a of the rear bracket 80. Similar operation and effects as those of the example embodiment are able to be obtained in this case as well. In this way, restricting may be performed by any one of the example embodiment, the first modified example, or the second modified example, or by combining the example embodiment and the second modified example, or by combining the first modified example and the second modified example. Using a combination in this way enables the amount that the screw 36 is inserted to be firmly restricted.

Also, in the example embodiment, spin caulking is given as an example of crimping, but crimping is not limited to spin caulking. That is, any form of crimping may be used as long as it is a well-known form of crimping such as burring caulking and press crimping and the like.

Also, in this example embodiment, crimping is given as an example of deforming, but deforming is not limited to crimping as long as it is a retaining structure (i.e., a structure that inhibits slip-out).

What is claimed is:

1. A slide rail of a vehicle seat, comprising:
   a first rail to which a screw, having a screw thread provided on an outer periphery of the screw, is fixed; and
   a second rail that retains a nut into which the screw screws, the second rail is configured to move relative to the first rail by the nut rotating, wherein
   the first rail has a bracket provided with a through-hole into which the screw is screwed, the through-hole having a first diameter portion and a second diameter portion and a diameter of the first diameter portion is greater than a diameter of the second diameter portion,
   at least one end of the screw has a deformed portion that is deformed toward an outside in a radial direction of the screw with respect to the first rail while the at least one end of the screw is in a state passing through the through-hole,
   the deformed portion has a diameter that is larger than the diameter of the second diameter portion of the through-hole so as to keep the screw from slipping out of the through-hole, and
   the second diameter portion has a thread provided on an inside surface of the second diameter portion.

2. The slide rail according to claim 1, further comprising:
   a restricting portion that restricts an amount that the screw is inserted into the through-hole, the restricting portion is provided on at least one of the screw and the through-hole.

3. The slide rail according to claim 2, wherein
   the restricting portion is defined by a step provided on at least one of the screw and an inside of the through-hole.

4. The slide rail according to claim 1, wherein
   an incomplete thread is provided on one of the screw and the through-hole.

5. The slide rail according to claim 4, wherein the incomplete thread is provided on a base end of the screw.

* * * * *